United States Patent [19]
Tanaka et al.

[11] Patent Number: 5,447,048
[45] Date of Patent: Sep. 5, 1995

[54] CLUTCH DRUM AND APPARATUS FOR MANUFACTURING SAME

[75] Inventors: Haruo Tanaka; Toshiki Takeda, both of Sayama; Yoichi Kojima, Wako; Yoshihiro Kodama, Wako; Yorinori Kumagai, Wako, all of Japan

[73] Assignee: Honda Giken Kogyo Kabushiki Kaisha, Tokyo, Japan

[21] Appl. No.: 307,465

[22] Filed: Sep. 19, 1994

Related U.S. Application Data

[62] Division of Ser. No. 73,309, Jun. 8, 1993, Pat. No. 5,388,474.

[30] Foreign Application Priority Data

Jun. 30, 1992 [JP] Japan ................... 4-173341

[51] Int. Cl.$^6$ ............... B21D 15/02; B21D 53/28
[52] U.S. Cl. ........................... 72/315; 72/402; 29/893.34
[58] Field of Search .............. 72/402, 312–315, 72/353.6, 354.2, 370; 29/893.34, 893.3

[56] References Cited

U.S. PATENT DOCUMENTS 4,178,790 12/1979 Buckley ................... 72/402
4,470,290 9/1984 Jungesjo .............. 29/893.34

FOREIGN PATENT DOCUMENTS 176046 10/1983 Japan .............. 29/893.34
3-288017 12/1991 Japan .............. 29/893.34

*Primary Examiner*—Daniel C. Crane
*Attorney, Agent, or Firm*—Armstrong, Westerman, Hattori, McLeland and Naughton

[57] ABSTRACT

A clutch drum has a drum main body made of a metallic plate which is formed into a cup shape by drawing. Spline teeth for engaging with clutch plates are formed by pressing on a periphery of the drum main body. Pulsing teeth for detecting a rotational speed are formed by pressing on the periphery of the drum main body. An apparatus for manufacturing the clutch drum has a forming die onto which the drum main body is externally set in position. The forming die has formed thereon first tooth spaces corresponding to the spline teeth and second tooth spaces corresponding to the pulsing teeth. First tooth-shaped punches are provided so as to be movable radially back forth to form by pressing the spline teeth by urging the periphery of the drum main body into the first tooth spaces. Second tooth-shaped punches are provided so as to be movable also radially back and forth integrally with the first tooth-shaped punches to form by pressing the pulsing teeth by urging the periphery of the drum main body into the second tooth spaces.

2 Claims, 3 Drawing Sheets

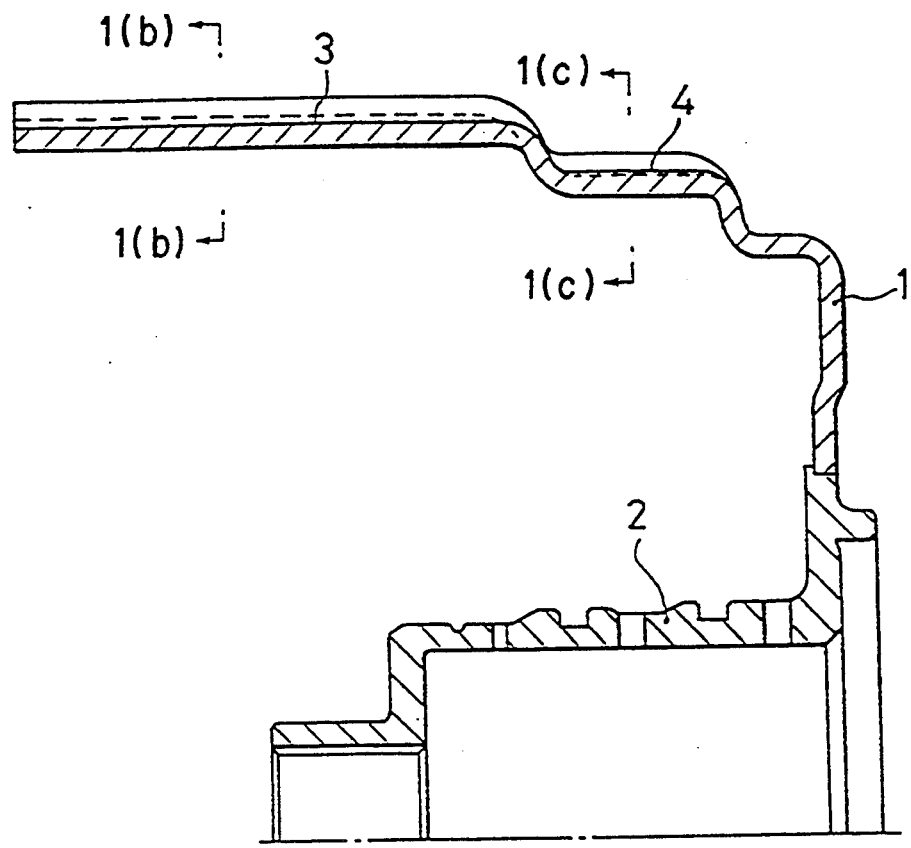
FIG_1(a)
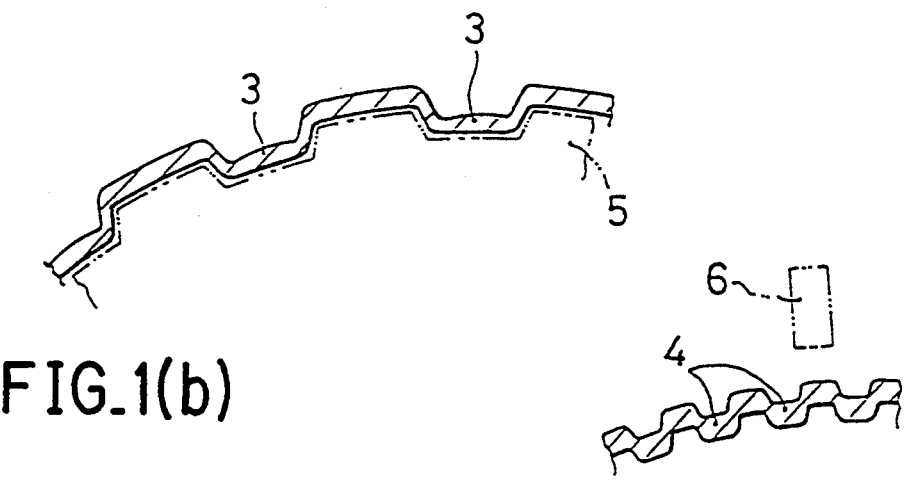
FIG_1(b)
FIG_1(c)

FIG_3
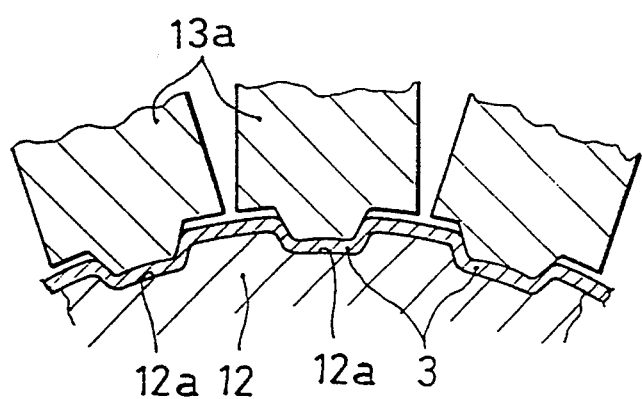
FIG_4
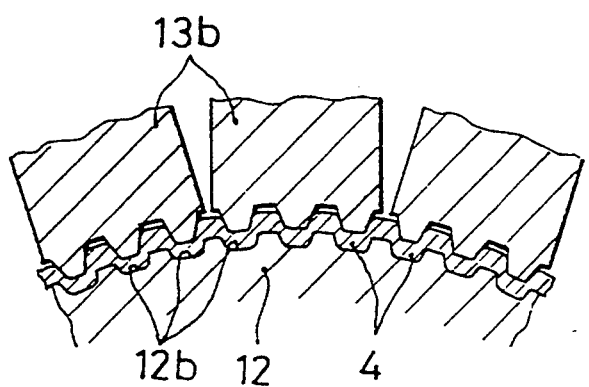

CLUTCH DRUM AND APPARATUS FOR MANUFACTURING SAME

This is a division, of application Ser. No. 08/073,309, filed Jun. 8, 1993, now U.S. Pat. No. 5,388,474, issued Feb. 14, 1995.

BACKGROUND OF THE INVENTION

1. Field of the Invention

The present invention relates to a clutch drum to be used in a hydraulic clutch for an automatic transmission or the like, as well as to an apparatus for manufacturing the same.

2. Description of Related Art

In order to detect the rotational speed of a clutch drum, there has hitherto been known an arrangement in which a ring-like pulsing gear formed by fine blanking is mounted on, or fitted onto, an external surface of a drum main body and is then welded thereto, and in which pulse signals are generated by a rotation sensor which is disposed opposite to the gear whenever each tooth crest of the gear (or top of each tooth) passes through the rotation sensor.

Further, though a clutch drum is normally made of a cast product, there has recently been developed, for reducing the weight, a metallic plate clutch drum which is made up by pressing spline teeth for engaging with clutch plates on a clutch main body which is obtained by drawing or reducing a relatively thin metallic plate into a cup shape.

However, if the clutch drum is provided with a pulsing gear as described above, the number of parts increases and the mounting of the pulsing gear on the clutch drum is time-consuming, resulting in a higher cost.

In the above-described metallic plate clutch drum the tooth profile can be simply formed by pressing on the drum main body at a high precision. Taking note of this fact, the present invention has an object of providing a low-cost clutch drum having integrally formed thereon pulsing teeth as well as an apparatus for manufacturing the clutch drum.

SUMMARY OF THE INVENTION

According to the present invention, the foregoing and other objects are attained by a clutch drum comprising a drum main body made of a metallic plate which is formed into a cup shape by drawing, spline teeth for engaging with clutch plates, the spline teeth being formed by pressing on a periphery of the drum main body, and pulsing teeth for detecting a rotational speed, the pulsing teeth being formed by pressing.

An apparatus of the present invention for manufacturing the above-described clutch drum comprises a forming die onto which the drum main body is externally set in position, the forming die having formed thereon first tooth spaces corresponding to the spline teeth and second tooth spaces corresponding to the pulsing teeth, first tooth-shaped punches which are movable radially back and forth for forming by pressing the spline teeth by urging the periphery of the drum main body into the first tooth spaces, and second tooth-shaped punches which are movable radially back and forth integrally with the first tooth-shaped punches for forming by pressing the pulsing teeth by urging the periphery of the drum main body into the second tooth spaces.

In manufacturing the clutch drum, the drum main body of a metallic plate which has been formed into a cup shape by drawing is mounted on or fitted onto the external surface of the forming die. Then, the first and the second tooth-shaped punches are moved radially inwards. According to this arrangement, the peripheral wall portion of the drum main body is urged by the first tooth-shaped punches into the first tooth spaces of the forming die, thereby forming the spline teeth by pressing. At the same time, the peripheral wall portion of the drum main body is urged by the second tooth-shaped punches into the second tooth spaces of the forming die, thereby forming the pulsing teeth by pressing.

In this manner, it becomes possible to detect the rotational speed of the clutch drum without the necessity of mounting afterwards, in an independent machining or working step, a separate pulsing gear on the drum main body.

In order to improve the resolution in detecting the rotational speed, it is desirable for the pulsing teeth to have a larger number of teeth than that of the spline teeth whose number is restricted within a certain limit from the viewpoint of mechanical strength. If the number of the pulsing teeth is arranged to be an integral multiple of 2 or more of the number of the spline teeth, the phase of the pulsing teeth in each unit group, which is defined to be the pulsing teeth corresponding to the integral number, relative to each spline tooth becomes equal throughout the entire circumference. Accordingly, each of the second tooth-shaped punches which are to be integrally combined with each of the first tooth-shaped punches for forming the spline teeth can advantageously be made up of the same shape.

BRIEF DESCRIPTION OF THE DRAWINGS

The above and the attendant advantages of the present invention will become readily apparent by reference to the following detailed description when considered in conjunction with the accompanying drawings wherein:

FIGS. 1(a) through 1(c) are sectional views of one example of a clutch drum according to the present invention, in which FIG. 1(a) is a vertical sectional view, FIG. 1(b) is a sectional view taken along the line 1(b)—1(b) in FIG. 1(a) and FIG. 1(c) is a sectional view taken along the line 1(c)—1(c) in FIG. 1(a);

FIG. 3 is a cross-sectional view taken along the line III—III in FIG. 2; and

FIG. 4 is a cross-sectional view taken along the line IV—IV in FIG. 2.

DESCRIPTION OF A PREFERRED EMBODIMENT

Figure 2:
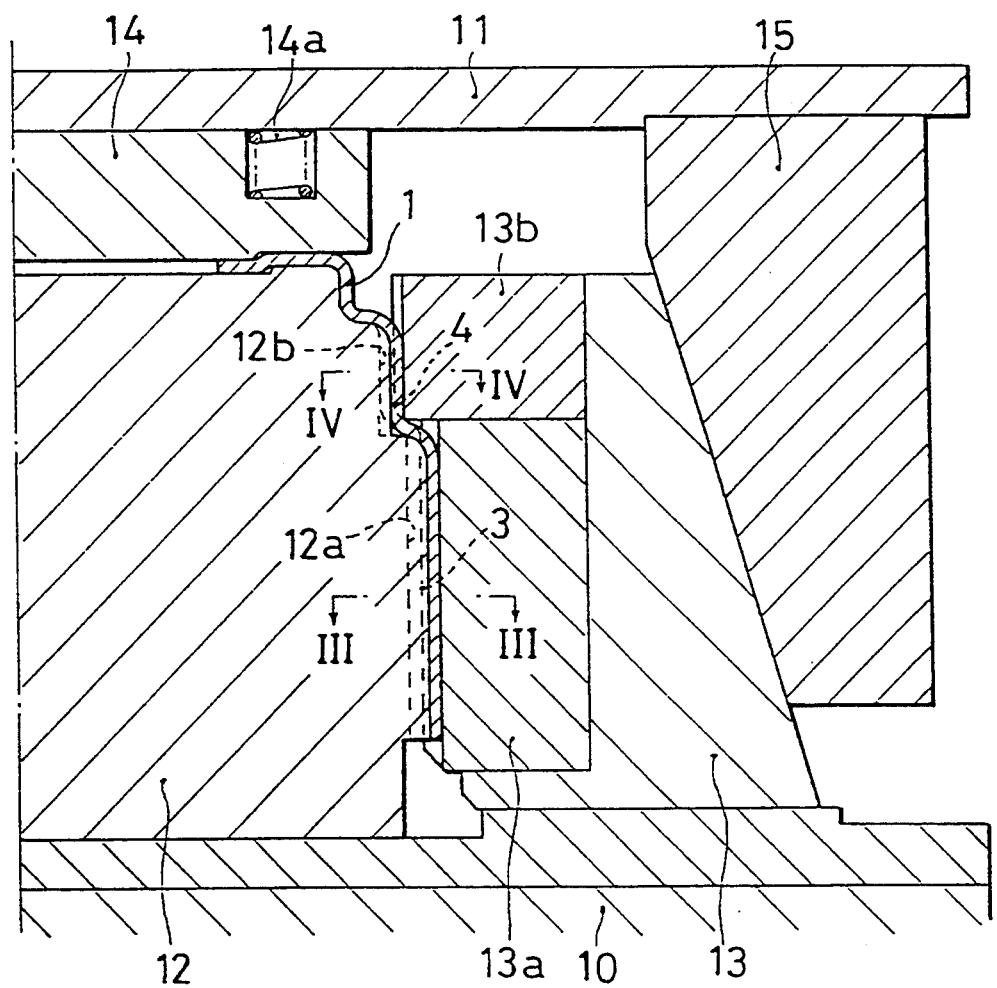
FIG. 2 is a vertical sectional view of one example of an apparatus according to the present invention.

FIG. 1(a) through FIG. 1(c) show an example of a clutch drum according to the present invention. As shown in FIG. 1(a), the clutch drum is made up of a metallic plate drum main body 1 which is made by drawing or reducing a relatively thin metallic plate into a cup shape, and a hub 2 which is welded to an end wall portion of the drum main body 1. The corner portion of the peripheral wall of the drum main body 1 is reduced in diameter in two stages. There are formed, in an ordinary portion (i.e., non-reduced portion) of the peripheral wall of the drum main body 1, spline teeth 3 defined by the generally corrugated cross-sectional shape of the wall portion which engage with clutch plates 5 as shown in FIG. 1(b) and, in the first-stage reduced portion which adjoins the ordinary portion, a generally corrugated cross-sectional shape which defines pulsing teeth 4 for detecting the speed of rotation which cooperate with a rotation sensor 6 as shown in FIG. 1(c). The number of the pulsing teeth 4 is arranged to be an integral multiple of 2 or more (3 times in this embodiment) of the number of the spline teeth 3.

An apparatus for manufacturing the spline teeth 3 and the pulsing teeth 4 by pressing is shown in FIG. 2. The apparatus is provided with a lower or bottom die 10 and an upper or top die 11 which is movable up and down. The lower die 10 is provided with a forming die 12 into which the drum main body 1 which has been formed by reducing in advance can be externally fitted for setting in position in the downward posture, and a plurality of cam sliders 13 which are positioned in the periphery of the forming die 12 such that they are radially movable back and forth. The upper die 11 is provided with a pad 14 which presses the clutch drum main body 1 against the forming die 12 such that the pad 14 is urged downwards by springs 14a. The upper die 11 is further provided with driving cams 15 in a vertically suspended manner so as to urge the cam sliders 13 radially inwards when the upper die 11 is moved downwards.

As shown in FIGS. 3 and 4, on an external periphery of the above-described forming die 12, there are formed in portions facing the ordinary portion of the peripheral wall portion of the drum main body 1 and the first-stage reduced portion, respectively, first tooth spaces (or grooves) 12a of a generally corrugated peripheral shape which correspond to the spline teeth 3 and second tooth spaces (or grooves) 12b of a generally corrugated peripheral shape which correspond to the pulsing teeth 4, respectively. Further, on an internal end portion of each cam slider 13 there is provided a first tooth-shaped punch 13a with one piece of tooth projection facing the portion in which the first tooth space 12a is formed, as well as a second tooth-shaped punch 13b with 3 pieces of tooth projections facing the portion in which the second tooth spaces 12b are formed, the latter (13b) being placed on top of the former (13a).

When the upper die 11 is lowered to urge the cam sliders 13 radially inwards via driving cams 15, the ordinary portion in the peripheral wall portion of the drum main body 1 is pressed or urged into the first tooth spaces 12a by means of the first tooth-shaped punches 13a, thereby forming the spline teeth 3 by pressing. At the same time, the first-stage reduced portion in the peripheral wall of the drum main body 1 is pressed or urged into the second tooth spaces 12b by means of the second tooth-shaped punches 13b, thereby forming the pulsing teeth 4 by pressing.

Unless the number of the pulsing teeth 4 is arranged to be an integral multiple of the number of spline teeth 3, the phase of the pulsing teeth 4 relative to the spline teeth 3 will be deviated at each spline tooth. It will therefore become necessary to change the shape of the second tooth-shaped punches 13b according to this deviation in phase. However, if the number of the pulsing teeth 4 is arranged to be an integral multiple of the number of spline teeth 3 as in the present invention, all of the second tooth-shaped punches 13b can advantageously be formed into the same shape.

It is readily apparent that the above-described clutch drum and the apparatus for manufacturing the clutch drum meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for manufacturing a clutch drum, said clutch drum comprising a drum main body made of a metallic plate which is formed into a cup shape having spline teeth for engaging with clutch plates and pulsing teeth for detecting a rotational speed, said spline teeth and said pulsing teeth being formed on a periphery of said drum main body in integral axially-spaced relation, said apparatus comprising:

a fixed lower die;
   a forming die which is fixed to said lower die and onto which said drum main body is externally set in position, said forming die having formed thereon first tooth spaces corresponding to said spline teeth and second tooth spaces corresponding to said pulsing teeth in integral axially spaced relation from said first tooth spaces;
   a plurality of circumferentially spaced cam sliders mounted on an outer periphery of said forming die for radially inward and outward movement on said lower die;
   first tooth-shaped punches carried by said cam sliders and movable radially back and forth for forming by pressing said spline teeth by urging said periphery of said drum main body into said first tooth spaces;
   second tooth-shaped punches carried by said cam sliders in axially spaced integral relation to said first tooth-shaped punches and movable radially back and forth for forming by pressing said pulsing teeth by urging said periphery or said drum main body into said second tooth spaces; and
   an upper die reciprocally movable with respect to said lower die, said upper die carrying a spring biased pad for securing said drum main body to said forming die and driving cam means disposed radially outwardly of said pad and operative to engage said cam sliders to move said cam sliders and said first and second tooth-shaped punches radially with respect to said drum main body.

2. An apparatus for manufacturing a clutch drum according to claim 1, wherein a number of said second tooth spaces on said forming die is made to be an integral multiple of 2 or more of a number of said first tooth spaces formed thereon and wherein a corresponding integral multiple of tooth crests formed on said first tooth-shaped punches is on each of said second tooth-shaped punches.

* * * * *